United States Patent
Domenicali et al.

(10) Patent No.: US 7,782,470 B2
(45) Date of Patent: Aug. 24, 2010

(54) SURFACE MEASUREMENT APPARATUS AND METHOD USING DEPTH OF FIELD

(75) Inventors: Peter Domenicali, Wilmington, MA (US); Clifford Hoyt, Wellesley, MA (US); Scott Determan, North Andover, MA (US); Peter Miller, Cambridge, MA (US)

(73) Assignee: Cambridge Research Instrumentation, Inc., Woburn, MA (US)

( * ) Notice: Subject to any disclaimer, the term of this patent is extended or adjusted under 35 U.S.C. 154(b) by 0 days.

(21) Appl. No.: 12/005,471

(22) Filed: Dec. 27, 2007

(65) Prior Publication Data

US 2008/0204697 A1 Aug. 28, 2008

Related U.S. Application Data

(60) Provisional application No. 60/877,315, filed on Dec. 27, 2006.

(51) Int. Cl.
*G01B 11/14* (2006.01)
(52) U.S. Cl. .................................. 356/614; 356/615
(58) Field of Classification Search ......... 356/614–622, 356/601–611, 456, 496, 237.1–237.4; 348/87, 348/92, 125–126; 250/201.2, 559.22, 559.29
See application file for complete search history.

(56) References Cited

U.S. PATENT DOCUMENTS

| 5,333,610 | A | * | 8/1994 | Hirao | 600/310 |
| 6,052,189 | A | * | 4/2000 | Fuse et al. | 356/615 |
| 6,549,289 | B1 | * | 4/2003 | Ellis | 356/603 |
| 7,400,414 | B2 | * | 7/2008 | Tobiason et al. | 356/607 |
| 2007/0086013 | A1 | * | 4/2007 | De Lega et al. | 356/456 |

* cited by examiner

*Primary Examiner*—Gregory J Toatley, Jr.
*Assistant Examiner*—Tri T Ton
(74) *Attorney, Agent, or Firm*—Cohen Pontani Lieberman & Pavane LLP (57) ABSTRACT

The invention provides for surface mapping of in-vivo imaging subjects using a single camera and a moveable stage on which a subject animal for in-vivo imaging is placed. Images are taken and the stage is moved by known amounts along the optical axis, and the heights of individual features on the subject are determined through analysis of focus, given the known stage displacement. Alternatively, height of sub-regions of the subject are determined through analysis of focus. A mesh or other surface can be constructed from individual features, to provide a surface map of the subject. Accuracy of 0.5 mm or better can be attained for mice and similarly sized subjects.

16 Claims, 5 Drawing Sheets

SURFACE MEASUREMENT APPARATUS AND METHOD USING DEPTH OF FIELD

RELATED APPLICATIONS

This application claims priority from U.S. Provisional Patent Application Ser. No. 60/877,315 which was filed on Dec. 27, 2006.

BACKGROUND OF THE INVENTION

In-vivo imaging systems are commercially available for imaging small animals such as mice, such as the Maestro system from CRI Inc., (Woburn Mass.), and the IVIS system from Xenogen (Hopkinton, Mass.).

Motorized sample stages are widely used in optical imaging equipment, to permit loading multiple samples, or to permit selection of a sub-region of the sample for closer examination or measurement.

Design of lenses and lens assemblies is discussed in a variety of textbooks such as Modern Optical Engineering, Warren J. Smith, McGraw-Hill, $3^{rd}$ Edition (2000). This describes the primary aspects of a lens assembly, including entrance and exit pupils and principal plane locations, as well as the factors determining them. These may be calculated using ray-tracing programs such as Zemax from Zemax Development Corp. (Bellevue, Wash.).

The benefits of mapping the surface contours of objects to be studied by optical imaging, have been recognized in the field of in-vivo imaging. See for example, US Patent Published Application 20060268153 to Rice et. al. which describes use of structured light and photographic views to attain this goal.

Use of structured light methods to perform surface mapping can be costly since specialized illumination optics are required.

It is desirable to provide for surface mapping that uses elements already present in an in-vivo imaging system, with minimal change or addition, which eliminates the need for specialized optics, or specialized illumination systems. It is further desirable that the apparatus and method for surface mapping be simple and accurate.

SUMMARY OF THE INVENTION

At the core of the invention is the recognition that best-focus algorithms can be used as a means of sample contour mapping for in-vivo imaging, to obviate or augment structured light or other complex arrangements. For example, a motorized stage can be used to move the subject up and down by known amounts while it is at least partially within the field of view of the imaging system. Images are taken with the subject in each stage position. By analyzing the sharpness of focus for individual features on the subject as the stage is moved to each position, it is possible to determine the height above the stage surface for each feature. Sharpness measures for features include the image volume of gradients or another measure of high-spatial frequency content. By interpolating between measurements of best-focus taken at successive positions, one can determine feature location to within 0.5 mm while taking images at moderate intervals such as every 1 mm of stage height motion.

According to an embodiment of the present invention, image-processing methods are used to locate recognizable features at or near the surface of the subject, such as sebum, hair follicles, eyes, moles, markings, pores, or the like. These features must be located in each image and correspondence made between features in each of the multiple views. These features are distributed across the surface of the subject, and form the reference points for depth measurements. A mesh is constructed from a network of such features, and this mesh is an estimate of the actual subject contour.

In the alternative, a sharpness measure can be derived for sub-regions of the image regardless of whether a feature is present or has been identified. This may be done for overlapping or non-overlapping sub-regions. The sub-regions are typically chosen so as to cover the subject regions for which a contour is sought, without significant gaps. For each region, the sharpness measure is taken at each stage height and a maximum sharpness height is identified. This is taken as the subject height associated with that sub-region. In this embodiment, it is desirable that the sharpness measure provide a confidence measure, to enable detecting when there is insufficient signal or contrast to develop a reliable height for that sub-region. This embodiment has the disadvantage that the sub-region estimate may be weighted by the presence and location of high-contrast structures on the surface of the subject, whose location is unpredictable and possibly unknown. As a result, the maximum sharpness height determined in this way may be more properly associated with a position somewhat off-centered in, though still within, the sub-region.

The invention is normally practiced as part of the apparatus and method of operation of an in-vivo imaging system. This is especially favored when the imaging system provides the necessary imaging and stage apparatus already to perform other essential functions. However, the invention may alternatively be practiced on a separate apparatus, such as a separate imaging station on which the subject profile is obtained before or after another in-vivo imaging measurement of interest. The imaging measurement data may be combined with the contour information in order to interpret the results. For example, the in-vivo imaging apparatus and method may be used to obtain a fluorescence image or a set of multispectral fluorescence images. Or, it may be used to obtain an bioluminescent image of the subject. In either case, one obtains an image based on the location of chemical compounds within the subject, and the interaction of light with tissue as it propagates within the subject. Knowledge of the three-dimensional shape of the subject can be used as an input to models such as Monte-Carlo models or photon diffusion models, to obtain an improved estimate of the amount and location of chemical compounds within the subject.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

In this discussion, technical terms have their normal meanings unless stated otherwise. "Subject" refers to an intact animal subject, including without limitation a mouse, rat, human, cat, dog, monkey, zebrafish, or any other creature for which it is desired to learn its surface contours. "Object" refers to a physical object, such as a subject, whereas "image" refers to an image formed by optics of some kind.

"Lens" means a lens or lens assembly, unless a more specific term is used. "Light" means light of any type whatsoever, including ultraviolet, visible, and infrared light. "Stage" means an apparatus for holding or supporting a subject. "Height" means a specified distance above the stage. Unless stated otherwise, the coordinate system is defined where the Z axis is perpendicular to the stage surface, and the stage surface defines an X-Y coordinate plane.

The invention is best explained by relating specific embodiments. It will be understood, however, that this is done for ease and clarity of illustration, and that the invention can be practiced more broadly, or with different apparatus, without deviating from its spirit.

The invention has as its aim the determination of the surface contours of a subject. Commonly, this is a subject intended for measurement in an in-vivo imaging experiment such as a fluorescence or bioluminescence imaging experiment. However, the invention can be used to measure the surface contours of subjects for other uses as well. It is a further goal of the invention to avoid the need for structured light, or to augment it rather than to rely upon it. That is, the invention may be practiced without need for structured light apparatus, though it does not interfere with such illumination if that is desirable for other reasons.

Figure 1:
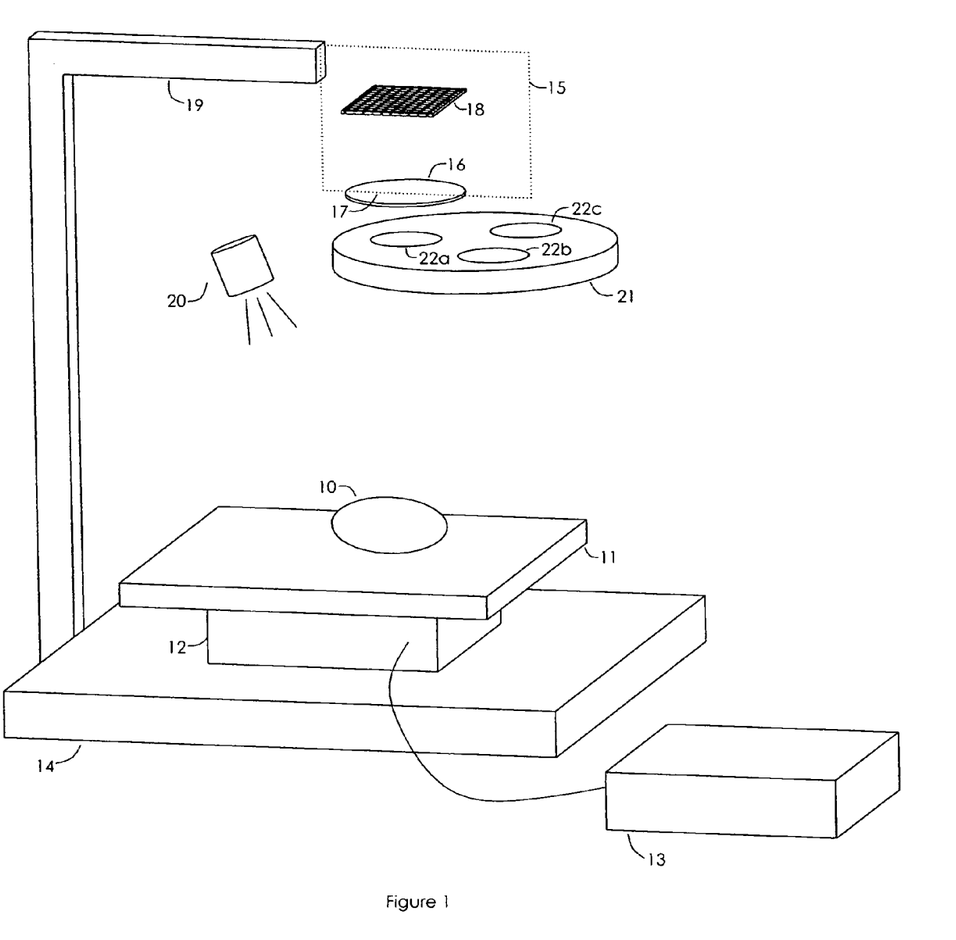
FIG. 1 is a schematic perspective view of an in-vivo imaging instrument suitable for practicing the present invention.

FIG. 1 is a schematic representation of an in-vivo imaging instrument suitable for practicing the invention. A subject 10 is placed on a stage 11 which is moveable by motion control elements 12 controlled by a computer 13. The motion control elements 12 are connected between the stage 11 and a chassis 14. An imaging system 15 includes an objective lens 16 having an entrance pupil 17 and an imaging sensor 18, and is connected to chassis 14 bay support member 19. An illumination source 20 illuminates the subject. The subject may alternatively be illuminated by natural light. An optional filter wheel 21 in front of the objective lens 16 selects filter 22a, 22b, or 22c to define a wavelength band or bands for the imaging measurement.

Figure 3:
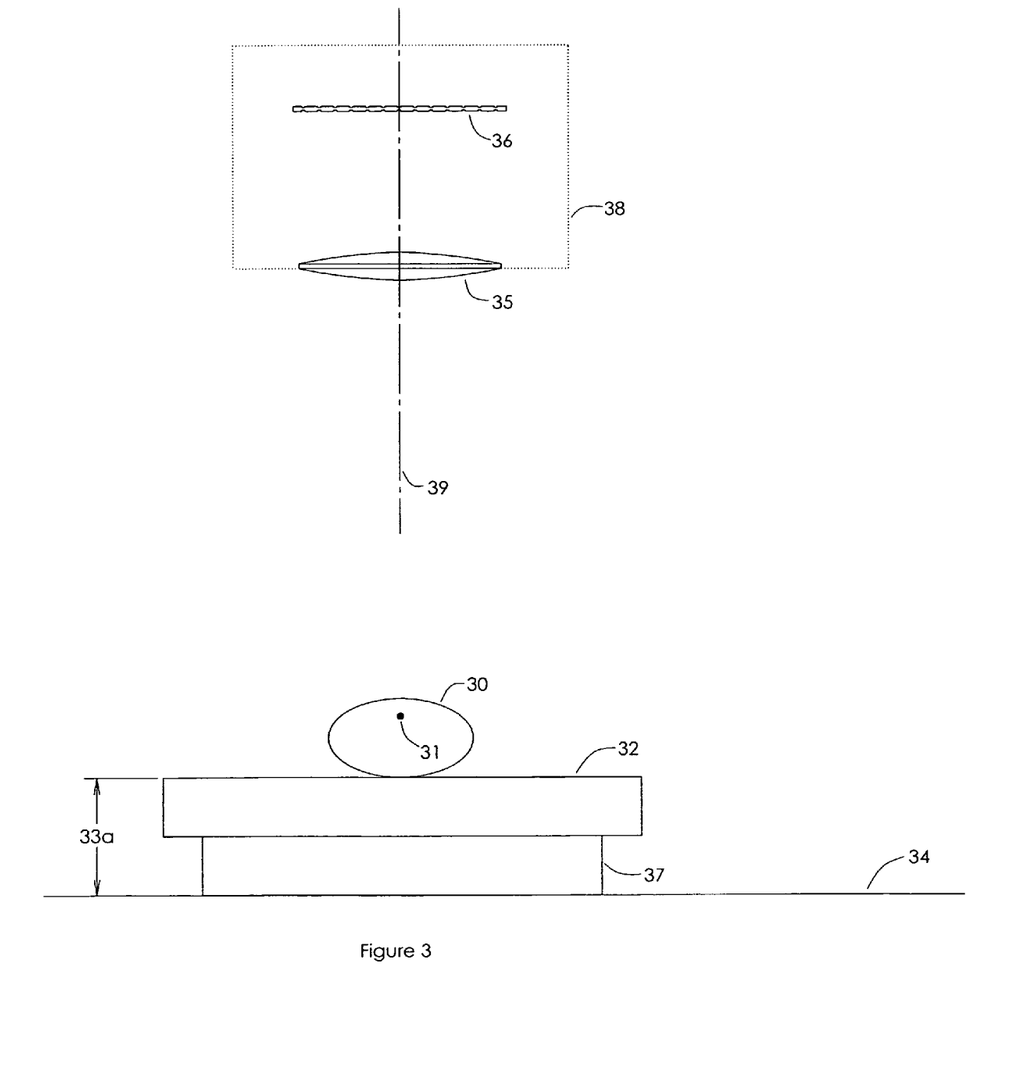
FIG. 3 is a schematic side view of an optical system used in the device of FIG. 1.

FIG. 3 shows a schematic diagram of an optical system which may be used in the device of FIG. 1. A subject 30 with feature 31 on the stage 32 in a first position where its surface is set to a height indicated by 33a relative to a reference indicated by line 34. In FIG. 3, the control element is a stage height control mechanism 37. Objective lens 35 and imaging sensor 36 form the imaging system 38 which has an optical axis 39. The subject may optionally be supported or surrounded by apparatus to provide a controlled temperature environment, or to restrain it against unwanted movement, or to deliver anesthesia, or combinations of these.

The lens 16, 35 is set to bring a selected object plane within the subject, to a focus at the imaging detectors 18, 36. A first image of the subject is recorded by the imaging system with the stage in a first position, and then the stage is moved by a known amount $\delta z$ and a second image is recorded. For both images, an estimate of focus is determined for a plurality of features on the surface of the subject.

Since the goal is to map the contour of the subject, it will be understood that the subject spans a range of heights. Similarly, the lens has a finite range over which objects can be clearly distinguished, which is denoted its depth-of-field. This depends on the aperture and magnification, as is known in the optical art. The depth of field in object space is approximately given by $$DOF = 2S*F/M^2 \quad [1]$$

where S is the resolvable spot size of the detector, F is the working F/number of the objective, and M is the image:object magnification factor. Note that the working F/number is higher than the nominal F/number, when operating at finite conjugate ratios, as is known in the art of optical design.

It is often desirable to select an optical system for which the depth-of-field is comparable to the contour height resolution that is sought, or larger. This enables the contour to be determined without an overly large number of images being taken. However, it is possible to practice the invention when the depth-of-field is finer than the contour height resolution being sought, though this may increase the number of images required.

For simplicity, the lens is treated in this discussion as if it were a perfect, thin lens element that obeys the paraxial lens approximation. This idealized lens assumption makes it easy to draw and understand optical diagrams, but such lenses do not exist in practice. One preferably will use a highly corrected lens such as the Micro-Nikkor AF60 D F/2.8 lens from Nikon (Melville, N.Y.), which has excellent imaging properties and yields nearly-ideal performance.

The minimum resolvable depth difference is an important figure-of-merit for a contour measurement system. Here we shall provide such an estimate for the invention in the case where the limiting angular resolution is that of a single pixel in the sensor. In this estimate, we use the thin-lens paraxial approximation where the principal planes and pupils are coincident with the lens itself and lens imaging properties are perfect. The latter condition can typically be attained with modern lens assemblies. To apply the results of this analysis to a real system, one may determine the actual locations of the pupils and principal planes of a lens using ray tracing programs or measurements. So these simplifications do not materially alter the result, compared to what can be attained in practice, or when a more detailed analysis is performed.

Modern scientific imaging sensors typically offer megapixel resolution, or higher. For example the Sony ICX-285 sensor has 1024×1392 resolution, meaning it is possible to discern 1000 spots or more, in any direction. The QImaging Retiga EXi from QImaging (Burnaby, British Columbia, Canada) is an example of a camera using this sensor. Similarly, the Texas Instruments Impactron EMCCD offers 1004× 1002 pixel resolution, and is used in the iXon EM DV885-LC camera from Andor Technology (Belfast, Northern Ireland). Both of these cameras offer very high sensitivity and are suitable for scientific grade imaging.

It is often beneficial to practice the present invention together with, or as part of, a high-performance measurement system such as an in-vivo fluorescence or luminescence measurement system. In such cases, an imaging sensor may already be present for purposes of making other measurements. When this is the case, it can be beneficial to use that existing imaging sensor for practicing this invention. However, this is not essential, and it is possible to use a separate imaging sensor, or a lower-performance imaging sensor, for practicing this invention. All that is important is that the sensor have sufficient size and resolution to provide images that are suitable for the measurement. It can be possible to use CMOS imaging sensors or other low-cost imaging sensors to practice the invention in cases where the sensor is not used for other measurements or subjected to other constraints.

One may consider some practical cases of interest. Suppose one uses a 50 mm lens and operates it at a 2:1 conjugate ratio, to produce a half-size image of the subject. The lens is an F/2 model but because at 2:1 conjugate ratio, the effective F/number is 3. The image is measured using a Kodak KAF-4202 imaging sensor (Kodak Image Sensor Solutions, Rochester N.Y.). This yields an 18 mm square image of the subject, with 2000×2000 pixel resolution. The subject is a mouse, which has a maximum height of 20 mm, and the lens is focused at the midpoint of the mouse.

For this system, the depth-of-field is given by $$DOF = 2 * 9\mu * 3 * 2^2 = 216 \text{ microns} \quad [2]$$

If the same arrangement is operated at F/6, the DOF is 432 microns. In an alternative embodiment, the mouse is imaged at a 4:1 conjugate ratio, to view a 72×72 mm sample region. It may be analyzed using the same equations and methodology. We tabulate the principal quantities for these cases as follows:

Note that the apparent location of any off-center feature will change as the stage is moved in Z unless the lens is a type which is telecentric in object space. This shift in apparent location can yield additional information about the subject feature position in some cases. However, in all cases it is necessary to recognize this effect, and to process feature images from successive images so the image analysis is not affected in unwanted ways. For example, the exact pixels corresponding to a given feature may change according to stage height, which must be accommodated by the exact focus estimation algorithm used.

Figure 2:
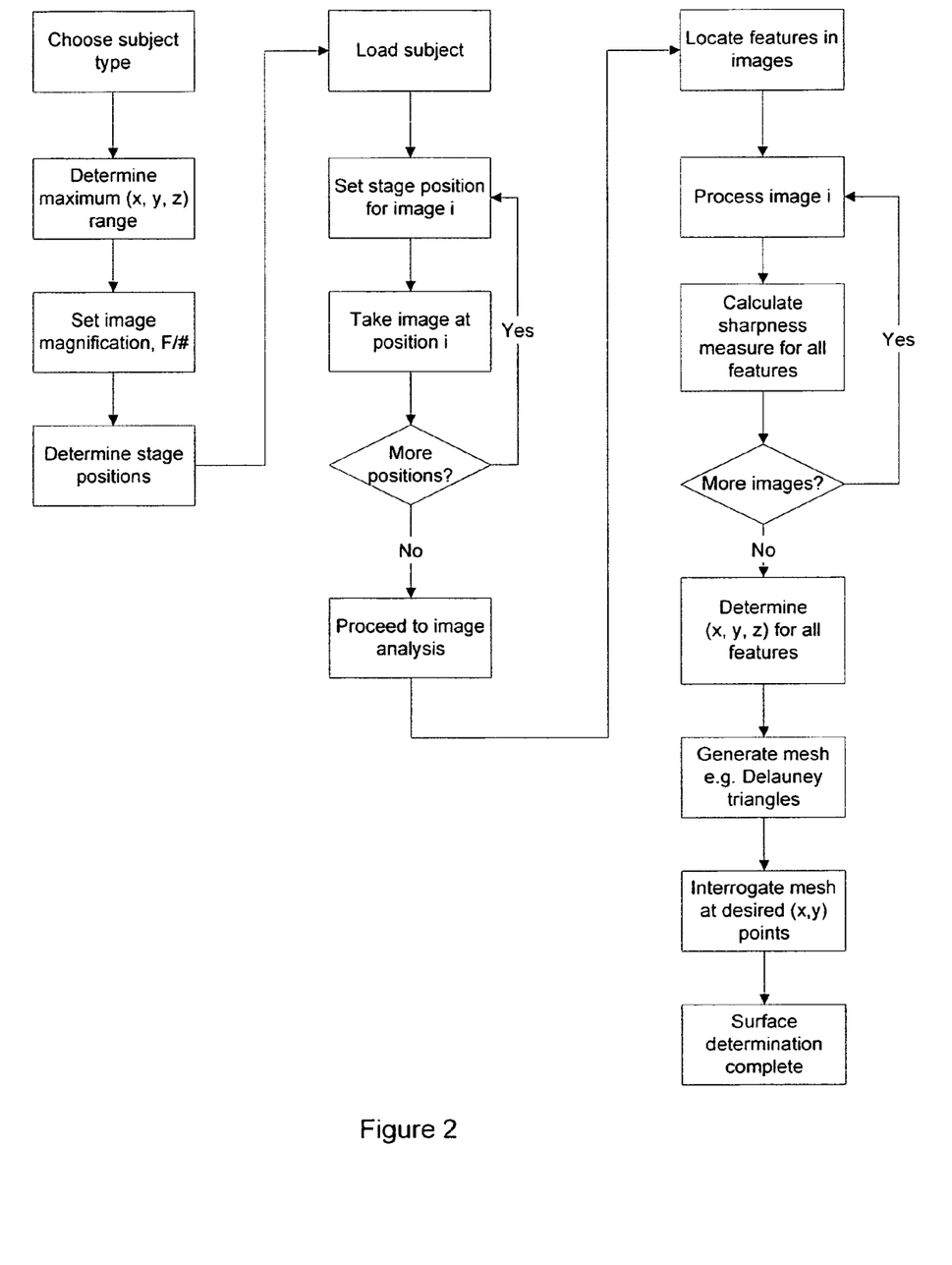
FIG. 2 is a flow diagram illustrating a method according to a first embodiment of the present invention for contour determination of a subject using the device of FIG. 1.

The overall measurement process is shown in FIG. 2 for an approach that uses feature location on the subject surface. A subject is loaded, the stage location is chosen, the stage is set to that position, a resolution is chosen and the instrument parameters are chosen, including F/number, magnification, and Z step size; the image is taken, and the process is repeated according to the flow-chart logic, until all subject regions of interest have been imaged in the various stage positions. Then, subject features are identified in each image, and image coordinates assigned to each feature. The correspondence between features in different images is determined. A focus sharpness estimate is determined for each feature in the region surrounding its best-focus height, from which the feature height is determined. The x and y coordinate of each feature is also determined, relative to a coordinate system.

TABLE 1

Depth resolution for sample instrument used at various magnifications.

| Mag | Working distance | Sample region | F/# (nom) | F/# (wkg) | Spot size at sensor | DOF | Steps | δz |
|---|---|---|---|---|---|---|---|---|
| 2:1 | 150 mm | 36 mm × 36 mm | 2 | 3 | 9μ | 0.22 mm | 40 | 0.25 mm |
| 2:1 | 150 mm | 36 mm × 36 mm | 4 | 6 | 9μ | 0.44 mm | 40 | 0.25 mm |
| 4:1 | 250 mm | 72 mm × 72 mm | 2 | 2.5 | 9μ | 0.72 mm | 20 | 0.50 mm |
| 4:1 | 250 mm | 72 mm × 72 mm | 4 | 5 | 9μ | 1.44 mm | 20 | 0.50 mm |

In other instruments, the sensor size and pixel resolution may be different, but the principle of operation, and of estimating the degree of depth resolution that can be attained, is similar.

The example above considers a case where the stage is moved by an amount of 0.5 mm for the high-resolution maps, and 1 mm for the low resolution maps. However, other movements may be used according to the need at hand. The resolution and step size will depend on the requirement at hand for the subject and the degree of accuracy sought in the contour map.

The overall process consists of the measurements just described, along with a process for data analysis. In any practical system, the overall contour measurement is done in an automated manner, using computer analysis of the various images. So, it is necessary to analyze the images; determine the subject height at a plurality of locations on the subject surface; and construct a contour from the height values.

When features are used in this process, the data analysis involves automatic detection of the features in each of successive images; automated assignment of a sharpness and location to each feature in each image; automatic correlation of which feature in each image corresponds to the same feature in other images; and construction of the contour from the mesh of features, once the height is determined for each one.

Each feature is added to a list of features and 3-dimensional locations to form a list of features. From the feature mesh, a contour surface is generated.

Figure 4:
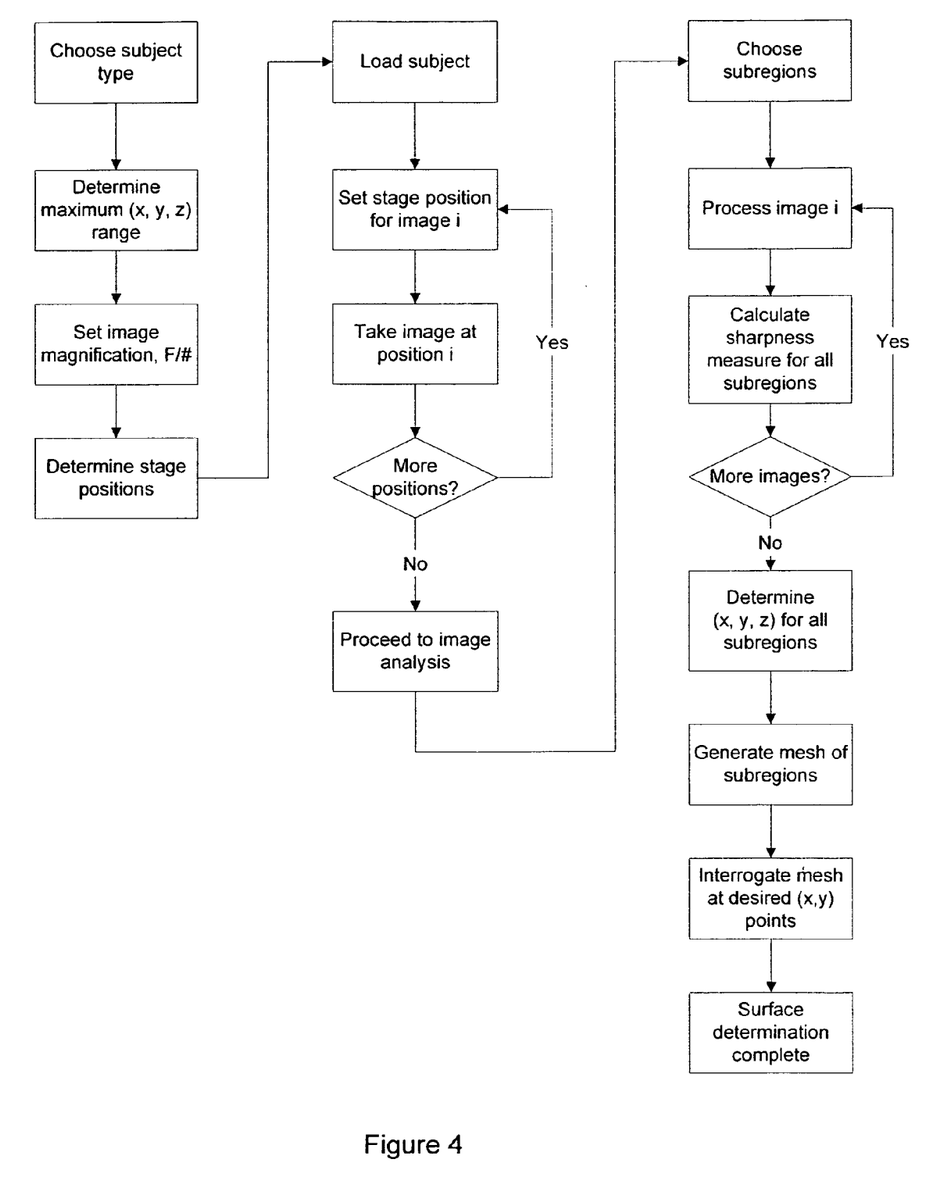
FIG. 4 is a flow diagram illustrating a method according to another embodiment of the present invention for contour determination of a subject using the device of FIG. 1.

Another approach is shown in FIG. 4, which does not rely on feature location but instead analyzes sub-regions of the image regardless of whether a feature is present or has been located. It applies a sharpness measure to a plurality of sub-regions of the image; these regions may be overlapping or distinct, and together they cover substantially the entirety of the subject for which a surface contour is desired.

A survey of methods for determination of best-focus is presented by Sun et. al. in "Autofocusing in computer microscopy: Selecting the optimal focus algorithm", Yu Sun, Stefan Duthaler, Bradley Nelson, Microscopy Research and Technique 65, pp. 139-149, Wiley-Interscience (online, www.interscience.wiley.com) (2004). The 18 algorithms listed therein include gradient methods, Laplace methods, variance and autocorrelation methods, and statistical measures of the pixel values. Favored methods include normalized variance and standard-deviation based correlation, but others can be used as well. In the manner taught by that article, which is included in its entirety in this application, it is possible to select an algorithm based on its performance for actual samples, using criteria such as accuracy, range, false maxima, peak width, and noise level to rank candidate algorithms. While that article describes focus algorithm performance for purposes of computerize focusing of a microscope on a nominally planar sample, the same principles apply in using optimum focus algorithms in the context of the present invention, where the goal is to assess best-focus of images or subregions of images of a three-dimensional subject in order to estimate what height corresponds most nearly to the image region or subregion.

It is not necessary that equal sized steps be used for the contour measurement. For example, one may use smaller steps when mapping a height region of the subject for which improved resolution is sought, and then change to larger steps when mapping a height region of the subject for which coarse resolution is sufficient; or vice versa. Similarly, the F/number of the lens may be changed within the course of the measurement to change the depth-of-field used for different subranges of the overall height range being measured.

The feature detection can be done using image processing techniques such as thresholding based on intensity, contrast, and size. Feature location can be done using a center-of-mass calculation for the pixels within a feature. Correlation can be done by choosing the nearest feature in corresponding images, after applying the transform based on the known stage translation. The contour can be constructed by a variety of methods, such as constructing a list of all features; generating an x-y grid and interrogating the list for the nearby points from which an interpolated value for z is developed at the grid location. Here the method of Delauney triangulation can be used to develop a connected set of triangles from the features, within which one may interpolate to define a surface at any desired (x, y) location.

Figure 5:
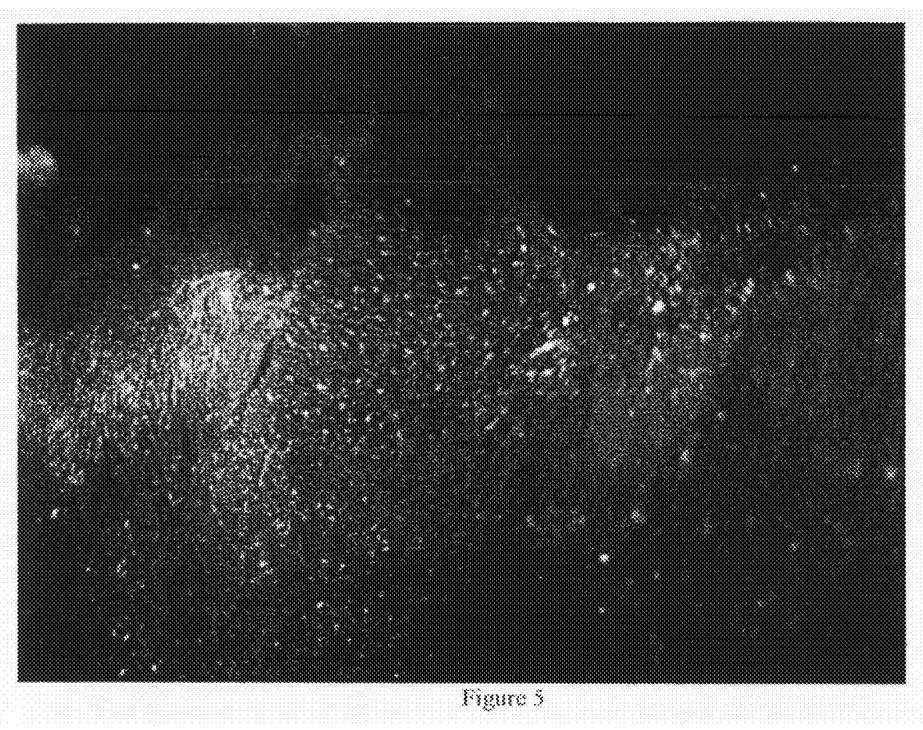
FIG. 5 is an image of mouse showing the sebum features that are visible as bright spots on the mouse skin.

The images used for this process can be any type which reveal features of adequate contrast for the measurement of feature location. For example, fluorescent images can be used where that reveals features. FIG. 5 shows a fluorescent image of a nude mouse subject which was illuminated with excitation light in the 480 nm range, and viewed through a long-pass filter with 520 nm cut-in. The mouse exhibits generalized autofluorescence over most of its surface, with punctuate bright regions corresponding to sebum on the subject. These sebum features would be suitable features for use in this invention.

However, the invention is not limited to use in fluorescent imaging modes. Ordinary reflected light imaging can also be used if that is preferred, and if it yields features that can be detected for a given subject. Indeed, any imaging mode may be used that provides feature location data, and the choice can be made based on factors such as what imaging modes are available for a given set of apparatus; what types of subjects are to be viewed and what features are present; and speed of image acquisition.

In some cases it may be preferred to provide a separate station rather than to make this part of a larger instrument system. This may be done because the imaging sensor in the larger instrument system is not suitable for the contour measurements; or because it is desired to provide the contour measurement as an accessory to an existing system; or to provide increased temporal throughput for the workstation; or for a variety of reasons. In any case, it is possible to perform the contour measurement before or after another measurement of interest; and then to combine the contour information with the results of the other measurement to arrive at a more complete understanding of the subject.

While it is expected that the invention is normally practiced on subjects which are anaesthetized or otherwise immobilized, the subject may still exhibit slight movement due to respiration and circulation functions. If it is desired, one may synchronize the image acquisition with subject breathing or heartbeat to reduce the effect of these factors on the measurement. Alternatively, several images can be taken which span the period of the movement, from which an improved estimate of position can be obtained by taking a mean value, or in the case of a repetitive movement, interpreting the images to determine which position corresponds to a specific state in the movement cycle.

Thus, while the invention has been described by use of specific, other embodiments can be employed without deviating from the invention. For example, one may employ a wide range of imaging sensors and lenses, consistent with the need to yield a suitable image of the subject. Similarly, any stage may be used that can move the subject over the required range of positions. Turning to the data analysis and derivation of a contour surface, there are many ways to exploit the core focus estimation approach that the invention provides, and the methods shown herein should be considered a non-limiting guide to how this can be accomplished. Alternative approaches can be used, such as lookup tables, numerical calculations, and so on, provided that the result is that a height estimate is determined from the apparent sharpness of focus of a feature in two or more images taken from different positions relative to the subject. Accordingly, it is understood that the scope of the invention is limited only be the attached claims, and not by the specific examples and embodiments.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining a contour of an animal subject using an in-vivo measurement system having a stage supporting the animal subject, control elements connected to a controller, and an imaging system, the method comprising the steps of:

incrementally moving, by the control elements, at least one of the stage and the object plane of the imaging system to a plurality of positions substantially in a direction parallel to an optical axis of the imaging system during the process for determining the contour;

taking, by the imaging system, images of the animal subject at each of the positions;

performing, by the controller, a best-focus algorithm using the images to determine the heights of individual features or subregions of the animal subject; and constructing, by the controller, a contour from the height values.

2. The method of claim 1, wherein the step of performing best-focus algorithms comprises analyzing sharpness for individual features in the images, wherein the sharpness measures for the individual features includes image volume of gradients or other measurements of high-spatial frequency content.

3. The method of claim 2, wherein the individual features comprise at least one of sebum, hair follicles, eyes, moles, markings, and pores.

4. The method of claim 3, wherein said step of constructing comprises constructing a mesh from a network of the individual features as an estimate of an actual contour of the animal subject.

5. The method of claim 1, further comprising the step of detecting, by the controller, features of the animal subject in the taken images using image processing techniques.

6. The method of claim 1, wherein the step of performing the best-focus algorithm comprises analyzing sharpness of subregions of each image.

7. The method of claim 1, wherein the animal subject is a mouse or a rat.

8. The method of claim 1, wherein said step of taking images is performed using reflected ambient light.

9. The method of claim 1, wherein said step of taking images comprises taking fluorescent images.

10. The method of claim 1, further comprising the step of taking an in-vivo image of the animal subject for an in-vivo imaging experiment and analyzing the in-vivo image using the constructed contour.

11. The method of claim 10, wherein the in-vivo image is obtained using fluorescence or bioluminescence emitted from the animal subject.

12. The method of claim 11, wherein the step of taking images of the animal subject at each of the positions is performed using reflected ambient light.

13. An in-vivo imaging system, comprising:
a stage for supporting an animal subject;
an imaging system;
control elements connected to a controller, the control elements capable of moving at least one of the stage and object plane of the imaging system substantially in a direction of an optical axis of the imaging system, the controller storing an executable program for determining a contour, the program comprising the executable steps of:
incrementally moving, by the control elements, at least one of the stage and the object plane of the imaging system to a plurality of positions substantially in a direction parallel to an optical axis of the imaging system during the determining of the contour;
taking, by the imaging system, images of the animal subject at each of the stage positions;
performing, by the controller, a best-focus algorithm for individual features or subregions of the animal subject in each of the images to determine the heights of each of the individual features or subregions; and
constructing, by the controller, a contour from the height values.

14. The system of claim 13, wherein the program further comprises the executable step of taking an in-vivo image of the animal subject for an in-vivo imaging experiment and analyzing the in-vivo image using the constructed contour.

15. The system of claim 14, wherein the in-vivo image is obtained using fluorescence or bioluminescence emitted from the animal subject.

16. The system of claim 15, wherein the step of taking images of the subject at each of the positions is performed using reflected ambient light.

* * * * *